United States Patent
Yoshizumi

(10) Patent No.: US 11,681,773 B2
(45) Date of Patent: *Jun. 20, 2023

(54) CALCULATING A SOLUTION FOR AN OBJECTIVE FUNCTION BASED ON TWO OBJECTIVE FUNCTIONS

(71) Applicant: INTERNATIONAL BUSINESS MACHINES CORPORATION, Armonk, NY (US)

(72) Inventor: Takayuki Yoshizumi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/131,044

(22) Filed: Dec. 22, 2020

(65) Prior Publication Data

US 2021/0109990 A1    Apr. 15, 2021

Related U.S. Application Data

(63) Continuation of application No. 15/210,477, filed on Jul. 14, 2016, now Pat. No. 10,949,492.

(51) Int. Cl.
*G06N 5/01* (2023.01)
*G06F 17/11* (2006.01)

(52) U.S. Cl.
CPC ............... *G06F 17/11* (2013.01); *G06N 5/01* (2023.01)

(58) Field of Classification Search
CPC ........................ G06F 16/24522; G06F 16/3329
See application file for complete search history.

(56) References Cited

U.S. PATENT DOCUMENTS

| 5,648,709 | A  | 7/1997  | Maeda      |
|-----------|----|---------|------------|
| 5,742,590 | A  | 4/1998  | Lin et al. |
| 6,826,668 | B1 | 11/2004 | Hsu et al. |
| 7,139,741 | B1 | 11/2006 | Benjamin   |

(Continued)

FOREIGN PATENT DOCUMENTS

CN    103488851 A    1/2014

OTHER PUBLICATIONS

List of IBM Patents or Patent Applications Treated as Related dated Dec. 22, 2020, 2 pages.

(Continued)

*Primary Examiner* — Daniel T Pellett
(74) *Attorney, Agent, or Firm* — Tutunjian & Bitetto, P.C.; Randy Emilio Tejeda

(57) ABSTRACT

Provided is an apparatus comprising a processor and one or more computer readable mediums collectively including instructions that, when executed by the processor, cause the processor to: acquire a candidate for a solution of an optimization problem for optimizing a third objective function based on a first objective function and a second objective function; obtain, as another candidate for the solution of the optimization problem, a solution that optimizes the second objective function under a constraint corresponding to a value of the first objective function for the acquired candidate; and select the solution of the optimization problem from among the plurality of candidates for the solution of the optimization problem. Also provided as the first aspect are a method and non-transitory computer readable storage medium.

20 Claims, 10 Drawing Sheets

(56) References Cited

U.S. PATENT DOCUMENTS

| | | |
|---|---|---|
| 7,323,036 B2 | 1/2008 | Boyden et al. |
| 7,406,053 B2 | 7/2008 | Cheung et al. |
| 7,522,963 B2 | 4/2009 | Boyden et al. |
| 8,542,869 B2 | 9/2013 | He et al. |
| 8,839,913 B2 | 9/2014 | Atalla et al. |
| 8,914,300 B2 | 12/2014 | Sustaeta et al. |
| 2002/0174052 A1 | 11/2002 | Guler et al. |
| 2003/0093357 A1 | 5/2003 | Guler et al. |
| 2004/0098288 A1 | 5/2004 | Minakuchi |
| 2005/0060130 A1 | 3/2005 | Shapiro et al. |
| 2006/0059018 A1 | 3/2006 | Shiobara et al. |
| 2007/0283107 A1 | 12/2007 | Ozaki et al. |
| 2008/0058616 A1 | 3/2008 | Nakagawa et al. |
| 2009/0248668 A1 | 10/2009 | Zheng et al. |
| 2012/0185215 A1 | 7/2012 | Hakko |
| 2012/0232959 A1 | 9/2012 | Subramanian et al. |
| 2013/0246117 A1 | 9/2013 | Gross et al. |
| 2014/0095424 A1 | 4/2014 | Sakurai et al. |
| 2014/0172743 A1 | 6/2014 | Yamamoto |
| 2014/0180992 A1 | 6/2014 | Lingenfelder et al. |
| 2015/0227848 A1 | 8/2015 | Amid et al. |
| 2015/0294226 A1 | 10/2015 | Mizuta et al. |
| 2015/0373049 A1 | 12/2015 | Sharma et al. |
| 2016/0378583 A1 | 12/2016 | Nakano et al. |
| 2017/0011292 A1 | 1/2017 | Thompson |
| 2017/0316079 A1 | 11/2017 | Lu et al. |
| 2018/0011977 A1 | 1/2018 | Takeda et al. |

OTHER PUBLICATIONS

Schohn, Greg et al., "Less is more: Active learning with support vector machines," ICML, Jun. 2000, 8 pages, 2,4.
Gavrilov, Zoya, "SVM tutorial," Slides, http://web.mit.edu./zoya/www/SVM.pdf, Jul. 2021, 6 pages.
U.S. Office Action issued in U.S. Appl. No. 15/210,280 dated Jul. 8, 2021, 58 pages.
U.S. Office Action issued in U.S. Appl. No. 15/210,280 dated Dec. 9, 2020, 57 pages.
Bishop, Christopher M, "Pattern recognition and machine learning," Springer, 2006, 758 pages.
U.S. Office Action issued in U.S. Appl. No. 15/210,280 dated Aug. 12, 2020, 54 pages.
U.S. Office Action issued in U.S. Appl. No. 15/210,280 dated Feb. 7, 2020, 40 pages.
Yoshizumi et al., "A Simulation-Based Algorithm for Supply Chain Optimization", Proceedings of the 2007 Winter Simulation Conference, pp. 1-8 (Year: 2007).
Bertsimas, D., "Statistics and Machine Learning via a Modern Optimization Lens", The 2014-2015 Philip McCord Morse Lecture, pp. 1-52 (Year: 2014).
U.S. Office Action issued in U.S. Appl. No. 15/210,658 dated Nov. 15, 2017, 7 pages.
Ganguly, S. et al., "Multi-objective planning of electrical distribution systems using dynamic programming," Electrical Power and Energy Systems, vol. 46, Mar. 2013. (pp. 1-3).
Goldfarb, D. et al., "Fast Alternating Linearization Methods for Minimizing the Sum of Two Convex Functions," Mathematical Programming, vol. 141, Issue 1, Oct. 2013. (pp. 1-28).
Mlakar, M. et al., "Comparing Solutions under Uncertainty in Multiobjective Optimization," Mathematical Problems in Engineering, vol. 2014, May 2014. (pp. 1-11).
Yoshizumi, T. et al., "A mathematical programming-based approach to determining objective functions from qualitative and subjective comparisons," AAAI'15 Proceedings of the Twenty-Ninth AAAI Conference on Artificial Intelligence, Jan. 2015. (pp. 1-7).
List of IBM Patents or Patent Applications Treated as Related dated Jul. 14, 2016.
Boyan, Justin A., et al., "Learning evaluation functions to improve optimization by local search," Journal of Machine Learning Research 1, Nov. 2000, pp. 77-112.
Boyan, Justin A., et al., "Learning evaluation functions for global optimization and boolean satisfiability," AAAI/IAAI, Jul. 1998, pp. 3-10.
U.S. Office Action issued in U.S. Appl. No. 15/210,280 dated Mar. 28, 2022, 73 pages.

| NUMBER OF MEDICAL DEVICES | 100 | 150 | 200 | 250 | 300 |
|---|---|---|---|---|---|
| BASELINE (ENUMERATION) | 13 | 68 | 273 | 925 | 2249 |
| FIG.2 | 1.4 | 4.9 | 15 | 37 | 61 |
| FIG.5 | 0.73 | 2.5 | 7.4 | 23 | 34 |

FIG. 8

```
int calc_f(i, j, UB) {
    if(THERE IS AN ENTRY AT INDEX (i, j) IN THE DP TABLE AND THE g VALUE IS LESS THAN OR EQUAL TO UB) {
        return THIS ENTRY VALUE;
    }
    if(ITEMS i TO j ARE PUT IN ONE CONTAINER) {
        if(EMPTY SPACE WHEN PUT IN THE SMALLEST SIZED CONTAINER THAT FITS ALL ITEMS >= UB) {
            return ∞;
        }else {
            return 1;
        }
    }
    val = min_{i<k<j} (calc_f(i, k, UB) + calc_f(k+1, j, UB));
    ADD (i, j, UB, val) TO DP TABLE
    return val;
}
```

FIG. 9

CALCULATING A SOLUTION FOR AN OBJECTIVE FUNCTION BASED ON TWO OBJECTIVE FUNCTIONS

BACKGROUND

The present invention relates to the calculation of a solution for an objective function based on two objective functions.

Conventionally, in optimization problems and simulations, the solution of an objective function is calculated using dynamic programming in a manner to satisfy the constraint conditions, as shown in U.S. Pat. Nos. 8,542,869, 8,839,913, and 5,742,590, for example.

However, even with an objective function by which it is possible to calculate a solution through dynamic programming as long as there is a single function, an objective function formed by adding together and combining two different types of objective functions cannot be used to calculate a solution using dynamic programming.

SUMMARY

According to a first aspect of the present invention, provided is an apparatus comprising a processor and one or more computer readable mediums collectively including instructions that, when executed by the processor, cause the processor to: acquire a candidate for a solution of an optimization problem for optimizing a third objective function based on a first objective function and a second objective function; obtain, as another candidate for the solution of the optimization problem, a solution that optimizes the second objective function under a constraint corresponding to a value of the first objective function for the acquired candidate; and select the solution of the optimization problem from among the plurality of candidates for the solution of the optimization problem. Also provided as the first aspect are a method and non-transitory computer readable storage medium. The first aspect may be operable to calculate solution candidates of the third objective function based on the first objective function and the second objective function, and select a preferable solution of the third objective function from among the plurality of solution candidates.

According to a second aspect of the present invention, provided are an apparatus and method in which the second objective function has an objective function value based on a sum of objective function values for partial problems of the optimization problem. The second aspect may be operable to calculate the solution of the optimization problem for optimizing the third objective function, based on the first objective function and on the second objective function for which the optimal solution can be written as the sum of optimal solutions of the partial problems.

According to a third aspect of the present invention, provided are an apparatus and method in which the first objective function has an objective function value based on a largest value or a smallest value of the objective function values for the plurality of partial problems obtained by dividing the optimization problem. The third aspect may be operable calculate the solution of the optimization problem for optimizing the third objective function, based on the first objective function for which the optimal solution can be written as the largest value or the smallest value of the optimal values for the partial problems and on the second objective function.

According to a fourth aspect of the present invention, provided are an apparatus and method in which the obtaining the other candidate for the solution of the optimization problem includes obtaining an optimal solution that satisfies the constraint for each of the plurality of partial problems obtained by dividing the optimization problem. The fourth aspect may be operable to calculate the other candidates for the solution of the third objective function by obtaining the optimal solution for each of the plurality of partial problems obtained by dividing the optimization problem.

According to a fifth aspect of the present invention, provided are an apparatus and method in which the selecting the solution of the optimization problem includes updating the selected candidates for the solution of the optimization problem, and the acquiring the candidate for the solution of the optimization problem includes repeating the obtaining the other candidate for the solution of the optimization problem and the selecting the solution of the optimization problem until there are no more solutions that optimize the second objective function. The fifth aspect may be operable to calculate a more preferable solution by repeatedly performing the step of selecting the solution of the third objective function.

According to a sixth aspect of the present invention, provided are an apparatus in which the instructions further cause the processor to store in a storage section, in association with at least one partial problem among the plurality of partial problems, an objective function value of the at least one partial problem corresponding to the first objective function and an objective function value of the at least one partial problem corresponding to the second objective function, and the obtaining the optimal solution that satisfies the constraint for each of the plurality of partial problems includes, for the at least one partial problem, using an objective function value stored in relation to the second objective function, if an objective function value stored in relation to the first objective function satisfies the constraint. Also provided as the sixth aspect is a method. The sixth aspect may be operable to reduce the cost of computing identical objective function values, by using objective function values stored in the storage section.

The summary clause does not necessarily describe all necessary features of the embodiments of the present invention. The present invention may also be a sub-combination of the features described above.

BRIEF DESCRIPTION OF THE DRAWINGS

FIG. 8 shows an exemplary performance time in which the apparatus according to the present embodiment calculates the solution.

FIG. 9 shows an exemplary pseudo-code of an algorithm of the apparatus according to the present embodiment.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
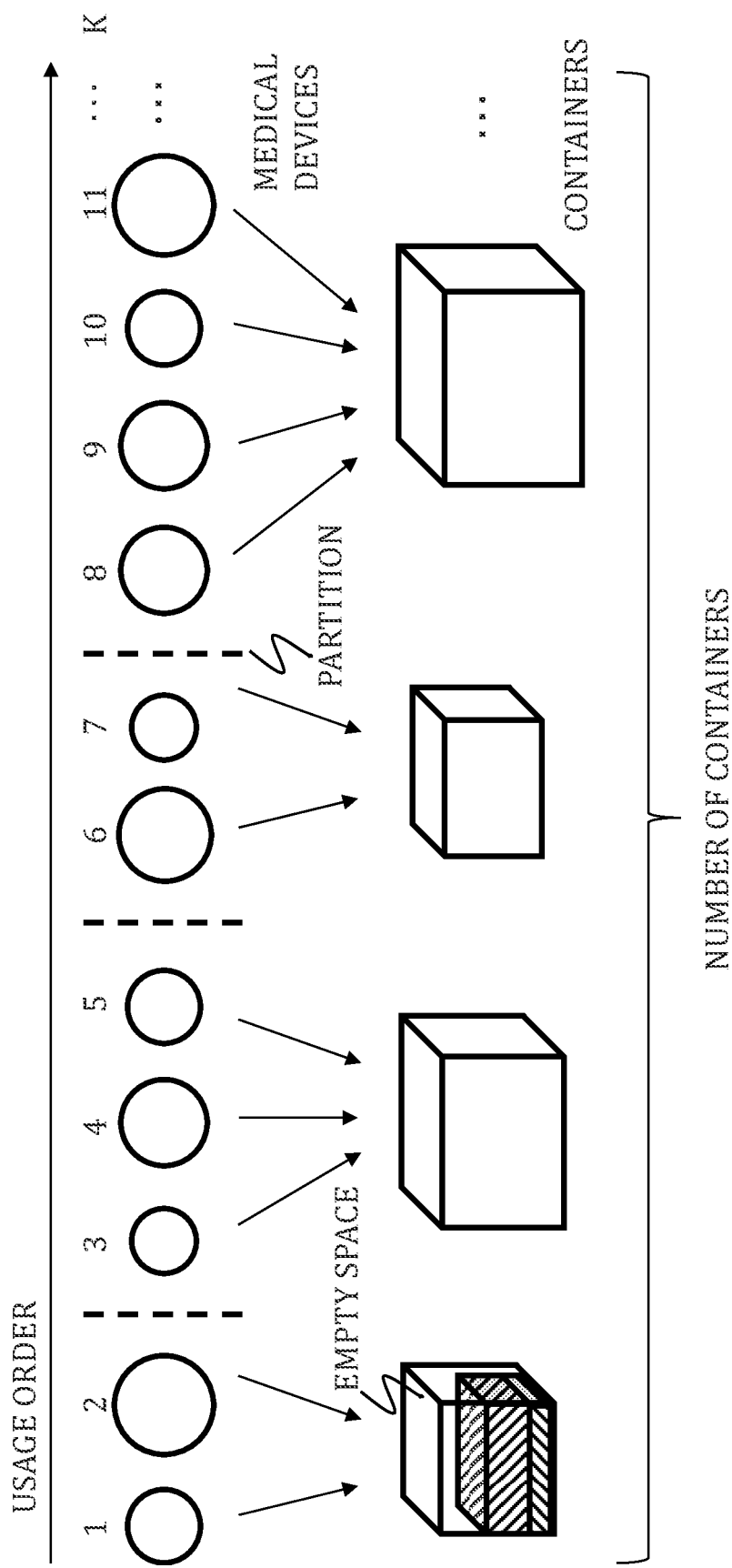
FIG. 1 shows an exemplary optimization problem to be solved by an apparatus according to an embodiment of the present invention.

FIG. 1 shows an exemplary optimization problem to be solved by an apparatus 100 according to an embodiment of the present invention. The optimization problem to be solved by the apparatus 100 may be a problem of optimizing an objective function that is based on two objective functions for which it is impossible to calculate a solution by merely using conventional dynamic programming. The example shown in FIG. 1 may be a problem of packing medical devices used for surgery. Each medical device has a different size and shape. In the example described here, the medical devices are used in order according to the progression of the surgery, and are packed in a plurality of containers. Here, the plurality of containers have a plurality of sizes. Specifically, FIG. 1 shows an example in which medical devices with various volumes arranged in a predetermined order are packed into containers having various volumes.

For example, each medical tool is preferably packed according to the type of surgery, ease of removal, ease of storage, and/or ease of sterilization. Furthermore, each medical tool preferably fills its package without leaving excess space in the package, and the medical tools are preferably packaged in a manner to use a smaller number of packages.

Such a packaging method can be treated as an optimization problem of determining where to position partitions that indicate divisions for inserting the medical devices into the containers, for an arrangement of medical devices in a predetermined order. For example, if the empty space g within the containers is to be minimized, the smallest amount of empty space g and the partition position k can be acquired by calculating a solution of a first objective function $g^*(i, j)$ shown in Expression 1.

$$g^*(1, K) = \min_{1 \le k \le K-1} \{\max(g^*(1, k), g^*(k+1, K))\} \qquad \text{Expression 1}$$

Here, K represents the number of medical devices. Furthermore, $g^*(1, k)$ represents the smallest empty space in a case where a division is made between the k-th and (k+1)-th medical devices in a sequence of medical devices and the first to k medical devices are packed. Yet further, $g^*(k+1, K)$ represents the smallest empty space in a case where the remaining portions from k+1 to K in the divided sequence of medical devices are packed. In other words, k represents the position of a partition. Accordingly, $\max(g^*(1, k), g^*(k+1, K))$ represents the larger empty space from among the smallest empty spaces calculated for each portion resulting from the division at the position k. In other words, $\max(g^*(1, k), g^*(k+1, K))$ represents the largest empty space in a case where packing is performed in a manner to minimize the empty space by making the division at the position k.

The first objective function $g^*(1, K)$ indicates the smallest value among the $\max(g^*(1, k), g^*(k+1, K))$ values for all positions k. In other words, the first objective function $g^*(1, K)$ indicates the smallest empty space by comparing the largest empty space among the plurality of packages corresponding to one division position to the largest empty space among the plurality of packages corresponding to another division position, for all cases of packing resulting from performing division respectively at all of the division positions. Accordingly, by using the first objective function $g^*(1, K)$ of Expression 1, it is possible to acquire the smallest empty space g resulting from the packing and the position k of the partition corresponding to this smallest empty space g.

In this way, the first objective function $g^*(1, K)$ may have an objective function value based on the smallest value among the objective function values for a plurality of partial problems obtained by dividing the optimization problem. The functions $g^*(1, k)$ and $g^*(k+1, K)$ obtained by dividing the first objective function $g^*(1, K)$ may each be further divided to form a plurality of partial problems. A detailed operation for dividing the objective function is described further below.

If the number f of containers is to be minimized, for example, the smallest number of packages and the position of the partition can be acquired by calculating the solution of a second objective function $f^*(i, j)$ shown in Expression 2.

$$f^*(1, K) = \min_{1 \le k \le K-1} \{f^*(1, k) + f^*(k+1, K)\} \qquad \text{Expession 2}$$

Here, K represents the number of medical devices and k represents the partition position. Furthermore, $f^*(1, k)$ represents the smallest number of packages in a case where a division is made between the k-th and (k+1)-th medical devices in a sequence of medical devices and the first to k medical devices are packed. Yet further, $f^*(k+1, K)$ represents the smallest number of packages in a case where the remaining portion of medical devices from k+1 to K in the divided sequence of medical devices is packed.

The second objective function $f^*(1, K)$ indicates the smallest value among the combinations of sums of $f^*(1, k)$ and $f^*(k+1, K)$ values for all positions k. In other words, the second objective function $f^*(1, K)$ indicates the smallest number by comparing the number of packages corresponding to one division position to the number of packages corresponding to another division position, for all cases of packing resulting from performing division respectively at all of the division positions. Accordingly, by using the second objective function $f^*(1, K)$ of Expression 2, it is possible to acquire the smallest number of packages resulting from the packing and the position k of the partition corresponding to this smallest number of packages.

In this way, the second objective function $f^*(1, K)$ may have an objective function value based on the sum of the objective function values for a plurality of partial problems obtained by dividing the optimization problem. The functions $f^*(1, k)$ and $f^*(k+1, K)$ obtained by dividing the second objective function $f^*(1, K)$ may each be further divided to form a plurality of partial problems. A detailed operation for dividing the objective function is described further below.

The objective functions shown in Expression 1 and Expression 2 can each be solved independently using dynamic programming. However, it is difficult to calculate a solution that simultaneously satisfies the two objective functions shown in Expression 1 and Expression 2. For example, if the objective function value h is f+g, the behaviors of the values of f and g with respect to the partition position k are different, and therefore it is impossible to simply apply dynamic programming. Accordingly, it has been difficult to solve the problem of "minimizing the number of containers used while also minimizing the empty space g in the containers," for example. Therefore, the apparatus 100 according to the present embodiment optimizes the objective functions based on the first objective function and the second objective function such as described above. The following is a description of such an apparatus 100.

Figure 2:
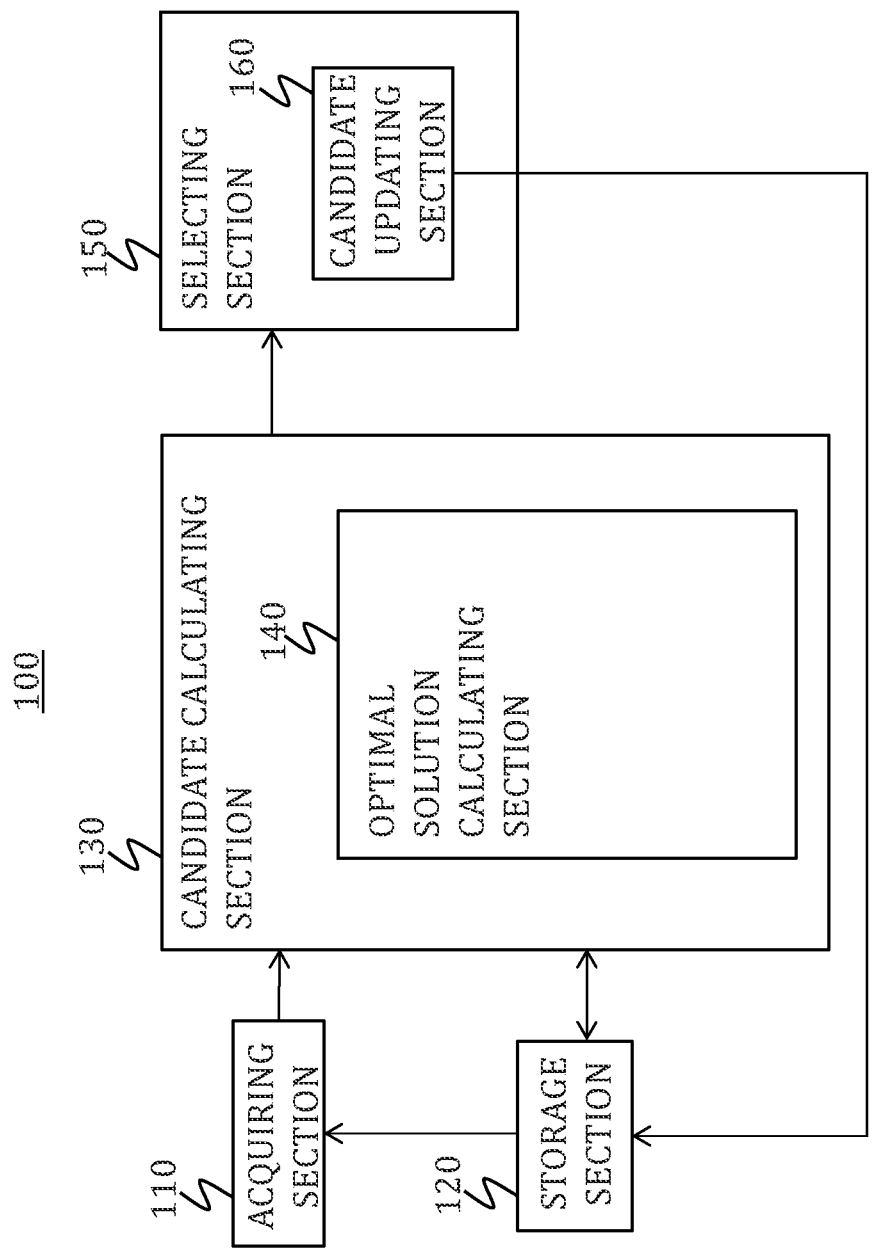
FIG. 2 shows an exemplary configuration of the apparatus according to the present embodiment.

FIG. 2 shows an exemplary configuration of the apparatus 100 according to the present embodiment. The apparatus 100 may be operable to calculate a solution that optimizes the objective function based on the first objective function and the second objective function. Here, the first objective function may have an objective function value based on a largest value or smallest value among the objective function values in a plurality of partial problems obtained by dividing an optimization problem. In the present embodiment, an example is described in which the first objective function indicates an objective function value g based on the smallest value among objective function values in a plurality of partial problems obtained by dividing an optimization problem.

The second objective function may have an objective function value f based on the sum of the objective function values in the partial problems of the optimization problem. The following describes an example in which a third objective function value h is defined as the sum f+g of the values of the first objective function and the second objective function. The apparatus 100 includes an acquiring section 110, a storage section 120, a candidate calculating section 130, and a selecting section 150.

The acquiring section 110 may be operable to acquire candidates for the solution of the optimization problem of optimizing the third objective function based on the first objective function and the second objective function. For example, the acquiring section 110 acquires the solution candidates by reading information stored in the storage section 120. The acquiring section 110 may acquire constraint conditions of the optimization problem. The acquiring section 110 may acquire the first objective function, the second objective function, and the third objective function. If information concerning the optimization problem is stored in an external database or the like, the acquiring section 110 may access this database to acquire information relating to solution candidates or the like. The acquiring section 110 may supply the candidate calculating section 130 with the acquired information.

The storage section 120 may be operable to store the solution candidates of the optimization problem. The storage section 120 may be operable to store data processed by the apparatus 100. The storage section 120 may store constraint conditions, the first objective function, the second objective function, the third objective function, and the like. The storage section 120 may store initial values for solutions of the optimization problem, constraint conditions, and the like. The storage section 120 may store intermediate data, calculation results, parameters, and the like that are generated by or used in the processing by which the apparatus 100 calculates solutions. The storage section 120 may supply a requesting source with the stored data in response to a request from any section within the apparatus 100. The storage section 120 may supply the acquiring section 110 with the stored solution candidates in response to a request from the acquiring section 110.

The candidate calculating section 130 may be operable to calculate, as other solution candidates for the optimization problem, solutions that optimize the second objective function under constraints corresponding to the first objective function values for the acquired solution candidates. The candidate calculating section 130 may use a solution optimizing the second objective function to calculate a first objective function value as a solution candidate. The candidate calculating section 130 may add the other calculated candidates to the set of solution candidates. The candidate calculating section 130 includes an optimal solution calculating section 140.

The optimal solution calculating section 140 may be operable to calculate an optimal solution that satisfies the constraints corresponding to the first objective function value, for each of the plurality of partial problems obtained by dividing the optimization problem. The optimal solution calculating section 140 may calculate the optimal solution for each partial problem while storing information concerning a start position, an end position, an optimal solution, and the like for each portion resulting from the division in the storage section 120. The candidate calculating section 130 may supply the selecting section 150 with the solution candidates. If the optimal solution calculating section 140 is unable to calculate an optimal solution, the candidate calculating section 130 may notify the selecting section 150 that an optimal solution could not be calculated.

The selecting section 150 may be operable to select a solution of the optimization problem from among a plurality of solution candidates of the optimization problem. The selecting section 150 may select, as the solution of the optimization problem, the candidate having a smaller value from among the plurality of candidates. The selecting section 150 includes a candidate updating section 160.

The candidate updating section 160 may be operable to update the selected solution candidates of the optimization problem. The candidate updating section 160 may update the solution candidates stored in the storage section 120. The candidate updating section 160 may be operable to update the constraints of the optimization problem. In this way, the acquiring section 110 can acquire the next solution candidate and constraint and supply the candidate and constraint to the candidate calculating section 130. In other words, the apparatus 100 may continue calculating solution candidates until the candidate calculating section 130 is no longer able to calculate a solution. If notification that an optimal solution cannot be calculated is received from the candidate calculating section 130, the selecting section 150 may output the most recently selected solution of the optimization problem.

In the manner described above, the apparatus 100 according to the present embodiment may use the constraints corresponding to the first objective function value to define the optimization problem P' for optimizing the second objective function. The solution for the second objective function can be calculated using dynamic programming, and therefore the apparatus 100 can calculate a solution of the optimization problem P'. The apparatus 100 then updates the constraints based on the calculated solution and calculates the solution of the optimization problem P'.

More specifically, the apparatus 100 may use an upper bound $UB\_g$ of the first objective function as the constraint corresponding to a value g of the first objective function $g^*(i, j)$, and define the optimization problem $P'(i, j, UB\_g)$ for optimizing the second objective function $f^*(i, j)$. The apparatus 100 may treat a solution of the second objective function $f^*(i, j)$ that is less than $UB\_g$ as being feasible, and calculate this solution as a solution candidate. The apparatus 100 may continue updating the value of $UB\_g$ and calculating the solution candidates, select a more preferable candidate, and output this candidate. Using this operation, the apparatus 100 can calculate an optimal solution of the third objective function based on the first objective function and the second objective function. Such an operation of the apparatus 100 is described below.

Figure 3:
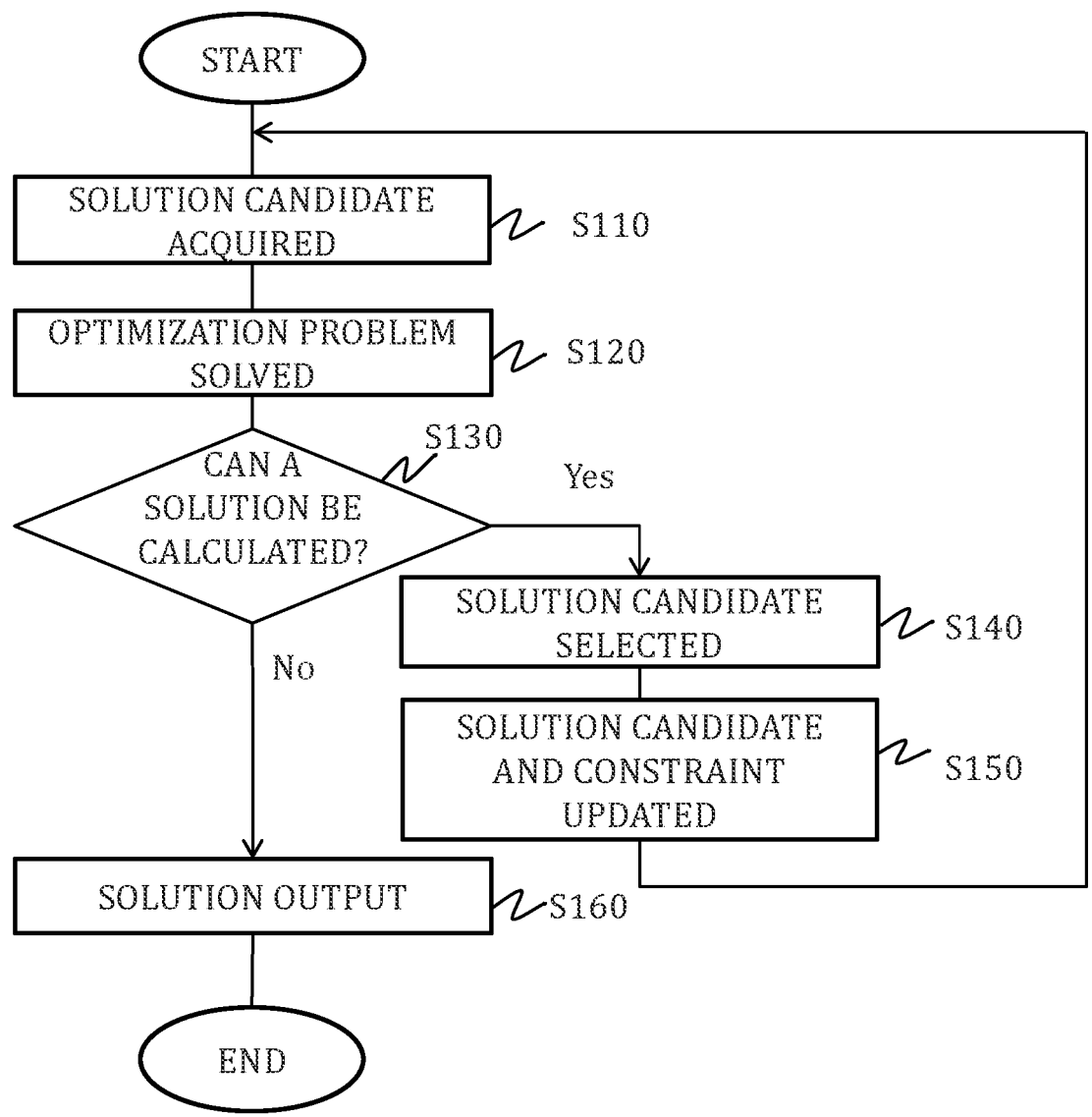
FIG. 3 shows an exemplary operational flow of the apparatus according to the present embodiment.

FIG. 3 shows an exemplary operational flow of the apparatus 100 according to the present embodiment. In the present embodiment, the apparatus 100 may be operable to calculate a solution of a minimization problem for the third objective function h*(i, j) defined as the sum of the first objective function g*(i, j) and the second objective function f*(i, j) by performing the processing from S110 to S160.

First, at S110, the acquiring section 110 may acquire a solution candidate UB from the storage section 120. If this is the starting stage of the operation, the acquiring section 110 may acquire the initial value of the solution candidate UB stored in the storage section 120. Here, the initial value of the solution candidate UB may be an infinitely large value or a value larger than a value that can be thought of as an optimal solution. The initial value of the solution candidate UB may be a number greater than the number K of medical devices.

The acquiring section 110 may acquire the constraint UB_g from the storage section 120. If this is the starting stage of the operation, the acquiring section 110 may acquire the initial value of the constraint UB_g stored in the storage section 120. Here, the initial value of the constraint UB_g may be an upper bound of the first objective function value. As an example, the initial value of the constraint UB_g may be an infinitely large value or the maximum capacity of the largest container. The acquiring section 110 may supply the candidate calculating section 130 with the acquired solution candidate UB and constraint UB_g.

Next, at S120, the candidate calculating section 130 may calculate the solution of the optimization problem P'(i, j, UB_g) using dynamic programming. In other words, the candidate calculating section 130 may use dynamic programming to calculate a solution of the second objective function f*(i, j) where the first objective function g(i,j) is less than the constraint UB_g. Here, the optimal solution of the second objective function f*(i, j) calculated by the candidate calculating section 130 is f_cur. In other words, the candidate calculating section 130 may acquire the smallest number f_cur of packages and a partition position for which the largest empty space is less than the constraint UB_g.

The candidate calculating section 130 may calculate the empty space for each package, which is an optimization result, and set the largest empty space as the optimal solution g_cur of the first objective function g*(i, j). The candidate calculating section 130 may add the sum of the calculated f_cur and g_cur to the solution candidates. The candidate calculating section 130 may use predetermined constants $C_1$ and $C_2$ to calculate the solution candidate $C_1 \cdot$f_cur+$C_2 \cdot$g_cur. In this case, the candidate calculating section 130 may use the predetermined constants $C_1$ and $C_2$ as weighting coefficients or conversion coefficients of the values of the first objective function and second objective function. In this way, if a solution of the optimization problem P'(i, j, UB_g) can be calculated (S130: Yes), the candidate calculating section 130 may supply the selecting section 150 with the calculation result and proceed to S140.

At S140, the selecting section 150 may receive the calculation result of the candidate calculating section 130, and select a solution from the solution candidates of the optimization problem. The selecting section 150 may select the solution candidate having a smaller value from among the plurality of solution candidates of the optimization problem. In other words, the selecting section 150 may select, as a new solution candidate UB, the smaller value between the solution candidate UB and the calculated solution candidate $C_1 \cdot$f_cur+$C_2 \cdot$g_cur. Furthermore, the selecting section 150 may calculate a new constraint UB_g=UB−$C_1 \cdot$f_cur by subtracting the second objective function value from the selected solution candidate UB. Such a calculation operation of the selecting section 150 can be expressed with Expression 3.

UB:=min(UB,$C_1$f_cur+$C_2$g_cur)

UB_g: =UB−$C_1$f_cur             Expression 3:

At S150, the candidate updating section 160 may update the solution candidate UB stored in the storage section 120 to be the selected solution. Furthermore, the candidate updating section 160 may update the constraint UB_g stored in the storage section 120 to be the new constraint.

The apparatus 100 returns to S110 and, if a solution of the optimization problem P'(i, j, UB_g) can be calculated, may repeat the operations from S110 to S150. In other words, the apparatus 100 may repeat the acquisition of a solution candidate of the optimization problem, calculation of another solution candidate of the optimization problem, and selection of the solution of the optimization problem until there are no more solutions for optimizing the second objective function where the first objective function is less than the constraint UB_g.

As a result of the apparatus 100 repeating these processes, the solution candidate UB exhibits a monotonically decreasing trend and the constraint UB_g also exhibits a decreasing trend. In other words, as a result of the apparatus 100 continuing this repetition, the constraint of the optimization problem P'(i, j, UB_g) becomes more strict, and therefore it will become impossible to calculate a solution. In this way, if it is impossible to calculate a solution of the optimization problem P'(i, j, UB_g) (S130: No), the candidate calculating section 130 may notify the selecting section 150 that a solution could not be calculated and proceed to S160.

At S160, the selecting section 150 may output the most recently selected solution candidate UB as the solution h of the optimization problem of the third objective function h*(i, j). The selecting section 150 may also output values of f_cur, g_cur, and/or the partition position k corresponding to the most recently selected solution candidate UB. As described above, the apparatus 100 according to the present embodiment can calculate a solution of the optimization problem for the third objective function by using the constraint based on the first objective function that is a portion of the third objective function and repeatedly performing dynamic programming on the second objective function that is the remaining portion of the third objective function.

The present embodiment describes an example in which the candidate calculating section 130 calculates the solution of the second objective function f*(i, j) using dynamic programming. In this case, the candidate calculating section 130 may use the optimal solution calculating section 140 to calculate the optimal solution that satisfies the constraint UB_g for each of the plurality of partial problems. The following describes the operation of the optimal solution calculating section 140.

Figure 4:
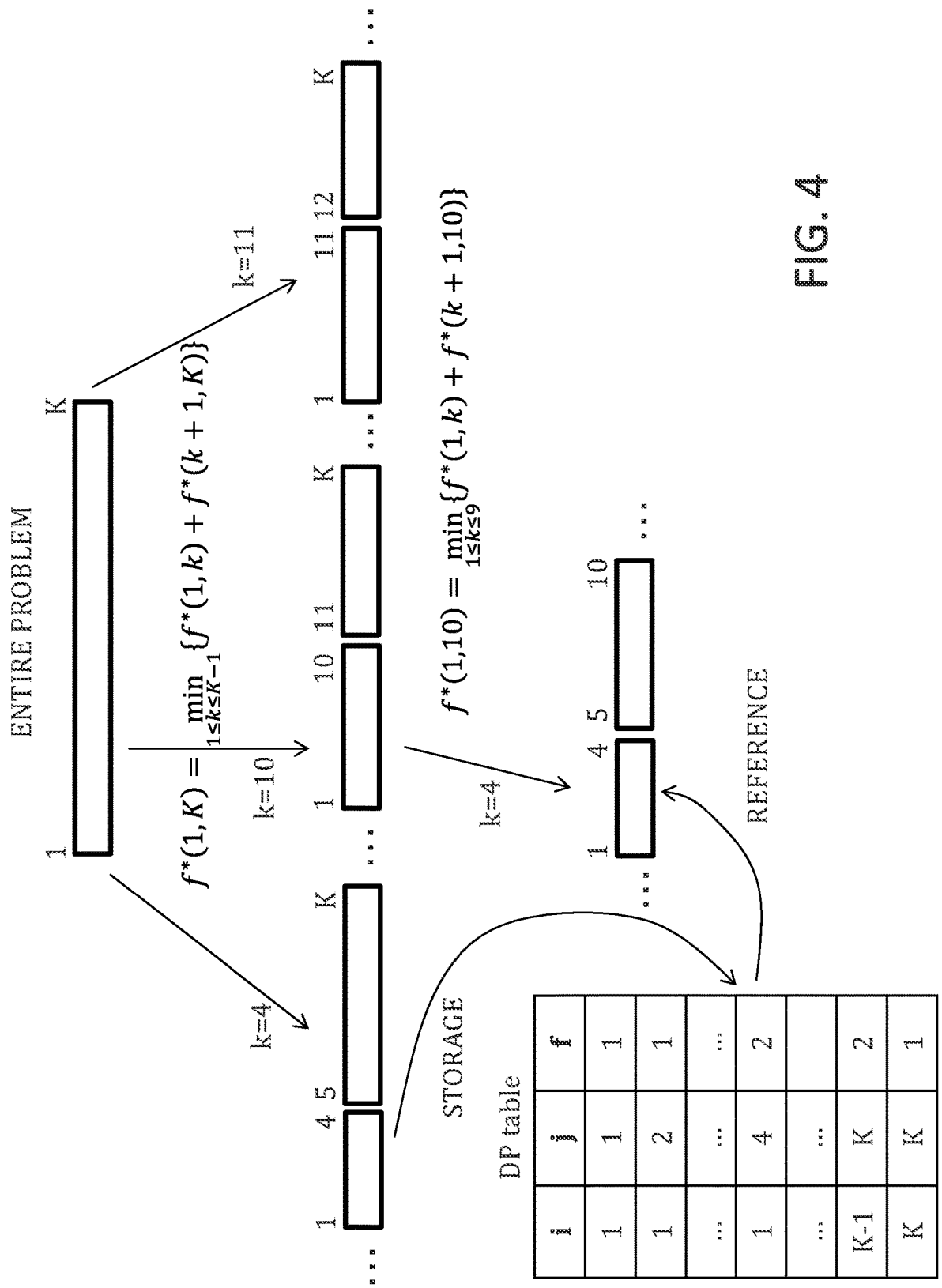
FIG. 4 shows an exemplary calculation of a solution using dynamic programming made by the optimal solution calculating section according to the present embodiment.

FIG. 4 shows an exemplary calculation of a solution using dynamic programming made by the optimal solution calculating section 140 according to the present embodiment. FIG. 4 shows an example in which the optimal solution calculating section 140 calculates a solution of the second objective function f*(i, j) shown in Expression 2. FIG. 4 shows the sequence of K medical devices using bar graphs 1 to K. In other words, the bar graph that is continuous from 1 to K represents the "entire problem." First, the optimal solution calculating section 140 may divide the sequence of medical devices between the k-th and (k+1)-th medical devices. The optimal solution calculating section 140 may make divisions in the sequence of medical devices using every k value. FIG. 4 shows an example of divisions at k=4, k=10, and k=11.

As shown in Expression 2, the optimal solution calculating section 140 may calculate the solution of the partial problem for each portion resulting from the division. For example, if the division is made at k=4, the optimal solution calculating section 140 calculates the partial problem f*(1, 4) and the partial problem f*(5, K). If the solution of the partial problem f*(1, 4) is being calculated, the optimal solution calculating section 140 may apply Expression 2 and further divide the sequence of medical devices including the first to fourth medical devices. In other words, the optimal solution calculating section 140 may use k=1 to k=3 in order to divide the partial problem f*(1, 4) in three different ways. In this way, the optimal solution calculating section 140 may more finely divide the medical devices to a point where a solution can be calculated.

If one solution is being calculated for each of the partial problems f*(1,1), f*(2, 4), f*(1, 2), f*(3, 4), f*(1, 3), and f*(4, 4), then min{f*(1, k)+f*(k+1, 4)} becomes 2, and therefore the optimal solution calculating section 140 may set 2 as the solution of the partial problem f*(1, 4). The optimal solution calculating section 140 may be operable to, if a solution of a partial problem is being calculated, store the calculated solution in the storage section 120 in association with the portion of the sequence of medical devices. If the solution of the partial problem f*(1, 1) is calculated to be 1, the optimal solution calculating section 140 may store information indicating the portion of the sequence with a start position of 1 and an end position of 1 in association with information indicating a value of 1 for the partial problem f*. The optimal solution calculating section 140 may store the calculated solutions as shown in the "DP table" of FIG. 4, for example.

The optimal solution calculating section 140 stores the calculated solutions, and may therefore use solutions that have already been stored for identical partial problems. For example, if the division is made at k=4 and the solution of the partial problem f*(1, 4) is calculated to be 2, the optimal solution calculating section 140 stores in the storage section 120 information indicating a start position of 1, an end position of 4, and a value of 2 for the partial problem f*. If the partial problem obtained by making a division at k=10 is being calculated, and if the partial problem f*(1, 10) is further divided and the partial problem f*(1, 4) is calculated, the optimal solution calculating section 140 may read the information indicating a value of 2 for the partial problem f*(1, 4) stored in the storage section 120 and omit the solution calculation operation.

In other words, before calculating the solution of a partial problem, the optimal solution calculating section 140 may query the storage section 120 concerning the presence of information indicating a matching start position and end position of the partial problem. If there is information indicating a matching start position and end position of the partial problem, the optimal solution calculating section 140 can omit the solution calculation process by reading the solution of this partial problem.

The apparatus 100 according to the present embodiment is described as being able to omit the calculation operation for a solution of a common partial problem if the solution of the second objective function f*(i, j) is calculated using dynamic programming. In addition to this, even if the dynamic programming is performed in iterations, the apparatus 100 may omit the calculation operation for a solution of a common partial problem. If the apparatus 100 performs the dynamic programming in iterations, the constraint conditions are different before and after each iteration, and therefore it is impossible to simply apply the operation shown in FIG. 4. Therefore, the following describes an apparatus 100 that performs such an operation.

Figure 5:
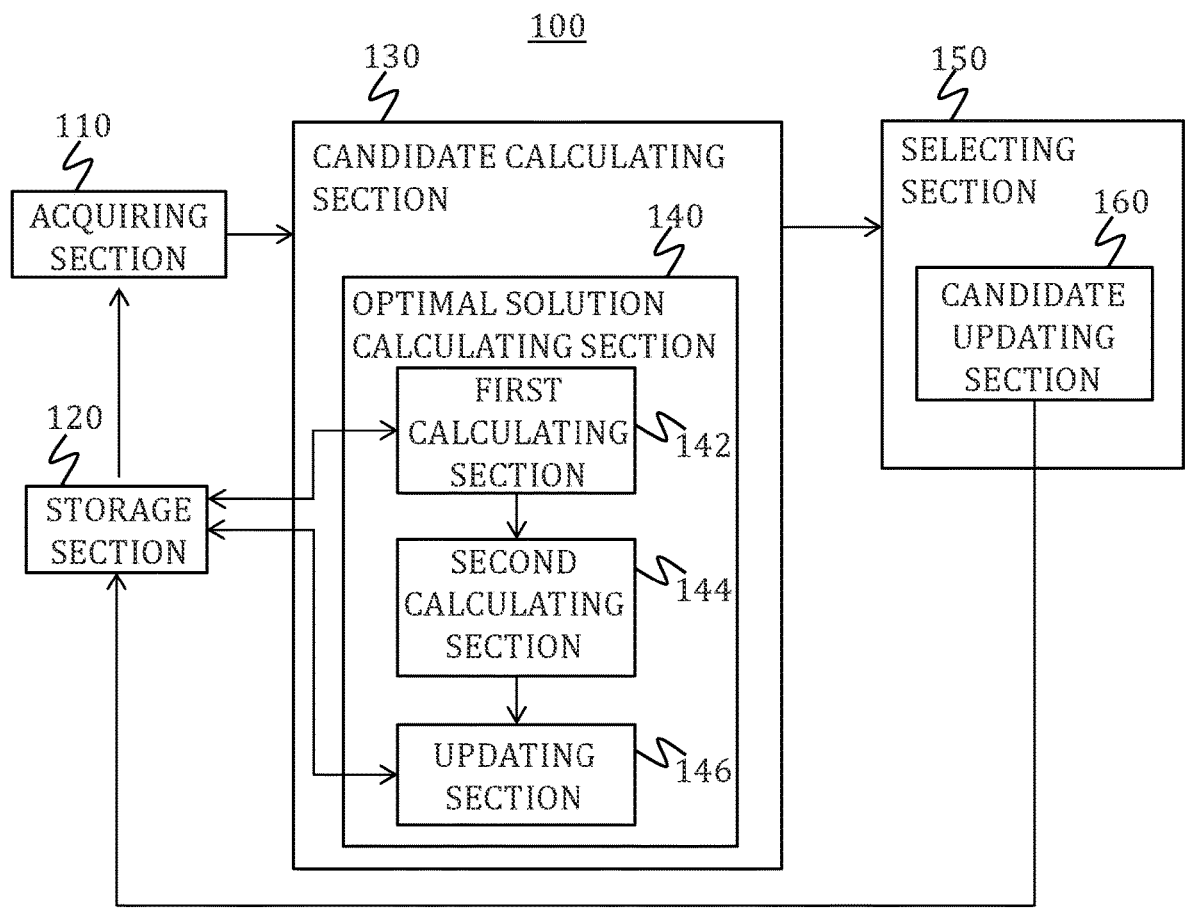
FIG. 5 shows an exemplary modification of the apparatus according to the present embodiment.

FIG. 5 shows an exemplary modification of the apparatus 100 according to the present embodiment. In the apparatus 100 of the present modification, components realizing substantially the same operations as in the apparatus 100 according to the embodiment shown in FIG. 2 are given the same reference numerals, and redundant descriptions are omitted. In the apparatus 100 of the present modification, the optimal solution calculating section 140 includes a first calculating section 142, a second calculating section 144, and an updating section 146.

The apparatus 100 of the present modification may be operable to, if the optimal solution calculating section 140 calculates the solution of a partial problem, store the calculated value and the value of the objective function corresponding to this solution in the storage section 120 in association with the portion of the sequence of medical devices. The optimal solution calculating section 140 may be operable to store in the storage section 120, in association with the at least one partial problem among the plurality of partial problems, an objective function value of this partial problem relating to the first objective function and an objective function value of this partial problem relating to the second objective function.

The first calculating section 142 may be operable to, for at least one partial problem, if the objective function value stored in relation to the first objective function satisfies the constraint, calculate a solution using the objective function value stored in relation to the second objective function in the storage section 120. If the constraint used in a past calculation satisfies the constraint of the partial problem being solved and the partial problem being solved matches a partial problem calculated in the past, the first calculating section 142 may use the solution of the partial problem calculated in the past as the solution of the partial problem being solved.

The second calculating section 144 may be operable to, for at least one partial problem, if the objective function value stored in relation to the first objective function does not satisfy the constraint, calculate a solution that optimizes the objective function value relating to the second objective function in at least one partial problem under this constraint. If the constraint used in a past calculation does not satisfy the constraint of the partial problem being solved, even if the partial problem being solved matches a partial problem calculated in the past, the second calculating section 144 may calculate the solution of the partial problem being solved without using the partial problem calculated in the past. Furthermore, if the partial problem being solved does not match a partial problem calculated in the past, the second calculating section 144 may calculate the solution of the partial problem being solved.

The updating section 146 may be operable to update the content of the storage section 120. The updating section 146 may be operable to update the content of the storage section 120 using the objective function value obtained in relation to the second objective function in at least one partial problem under the constraint condition. The updating section 146 may be operable to, if the second calculating section 144 calculates the solution of the partial problem being solved, update the storage section 120 by associating the calculated solution and the constraint used in the calculation with the portion of the sequence of medical devices.

Figure 6:
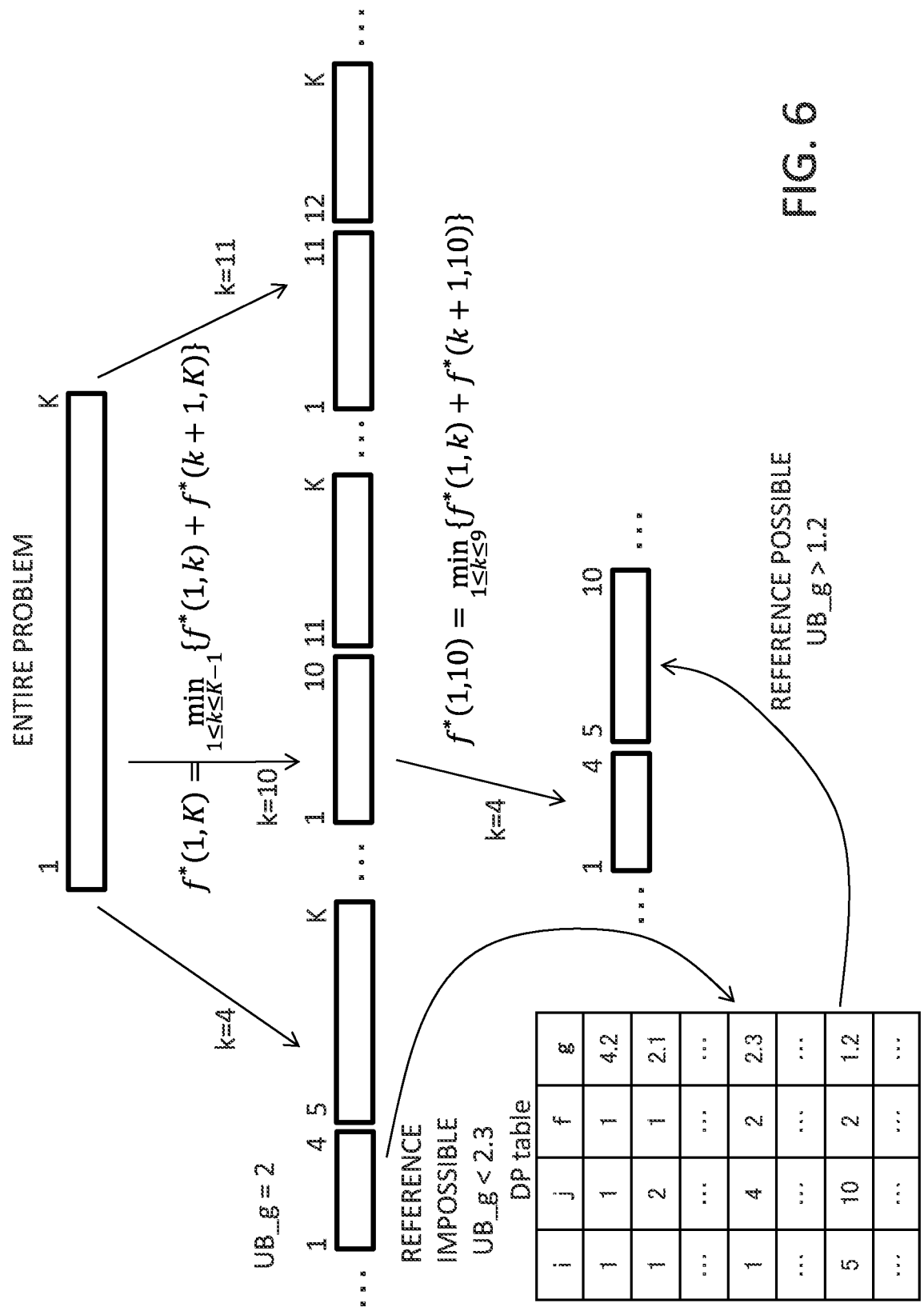
FIG. 6 shows an exemplary calculation of a solution performed by the apparatus of the present modification using dynamic programming.

The following describes an example in which the apparatus 100 according to the present modification described above calculates the solution of a partial problem. FIG. 6 shows an exemplary calculation of a solution performed by the apparatus 100 of the present modification using dynamic programming. FIG. 6 shows an example in which the optimal solution calculating section 140 calculates the solution of the optimization problem P'(i, j, UB_g) using dynamic programming. In the same manner as in FIG. 4, FIG. 6 shows the sequence of K medical devices using a bar graph from 1 to K. In other words, the bar graph continuous from 1 to K represents the "entire problem."

The optimal solution calculating section 140 may divide the sequence of medical devices between the k-th and (k+1)-th medical devices. The optimal solution calculating section 140 may make divisions in the sequence of medical devices using every k value. FIG. 6 shows an example of divisions at k=4, k=10, and k=11.

As described in FIG. 4, the optimal solution calculating section 140 may calculate the partial problem for each portion resulting from the division. In this case, the second calculating section 144 may calculate the solutions of the partial problems. If the solution of a partial problem is calculated, the optimal solution calculating section 140 of the present modification may store the calculated solution and the objective function value corresponding to this solution in the storage section 120 in association with the portion of the sequence of medical devices. For example, the optimal solution calculating section 140 may store the calculated solution as shown in the "DP table" of FIG. 6.

If a solution f of a partial problem f*(i, j) is calculated, the optimal solution calculating section 140 may store this calculated solution f in association with information indicating the portion of the sequence having the start position i and the end position j. In addition to this, the optimal solution calculating section 140 may further store the first objective function value g for the portion of the sequence having the start position i and the end position j. In other words, the optimal solution calculating section 140 may store the solution f of the partial problem f*(i, j) and the value g of the partial problem g*(i, j) in association with the information indicating the portion of the sequence having the start position i and the end position j. The value g of the partial problem g*(i, j) is a value calculated using the solution of the partial problem f*(i, j).

The first calculating section 142 may be operable to, if the dynamic programming is performed in iterations, calculate the solution of the optimization problem P'(i, j, UB_g) while referencing the DP table of the storage section 120. For example, if a solution of the second objective function is being calculated using the constraint UB_g, the first calculating section 142 first queries the storage section 120 concerning the presence of information indicating a matching start position and end position of the partial problem. If information concerning the same partial problem is stored in the storage section 120, the first calculating section 142 may read the corresponding first objective function value g.

The first objective function value g read by the first calculating section 142 is the solution of the partial problem g*(i, j), and therefore, if this value g is less than the constraint UB_g, the solution f stored in the storage section 120 is established as the solution of the partial problem f*(i, j) that uses the constraint UB_g. Accordingly, if the read first objective function value g is less than the constraint UB_g, the first calculating section 142 may judge that the solution stored in the storage section 120 satisfies the optimization problem P'(i, j, UB_g) being solved. In other words, the first calculating section 142 may omit the operation of calculating the solution of the optimization problem P'(i, j, UB_g) and output the solution f stored in the storage section 120.

For example, as shown in FIG. 6, if the optimal solution calculating section 140 makes the division at k=4, the second calculating section 144 calculates the solution of the partial problem f*(5, 10) in the process where the solution of the partial problem f*(5, K) is calculated. In this case, the second calculating section 144 stores the values f=2 and g=1.2 in association with the start position of 5 and the end position of 10 in the DP table of the storage section 120, for example. Then, if the optimal solution calculating section 140 makes the division at k=10 and the solution of the partial problem f*(5, 10) is calculated in the next iteration operation, as shown in FIG. 6, the first calculating section 142 checks whether the partial problem f*(5, 10) is stored in the DP table.

Since the partial problem f*(5, 10) is stored in the DP table, the first calculating section 142 may compare the constraint UB_g of the optimization problem P'(5, 10, UB_g) being solved to the stored value g=1.2. If the constraint UB_g is greater than 1.2, the first calculating section 142 may adopt the stored value f=2 as the solution. In this way, the first calculating section 142 performs a search for a solution based on the values of the first objective function and the second objective function, and can therefore judge whether there is a solution that satisfies the optimization problem P'(i, j, UB_g), omit the time and effort of calculating an identical solution, and increase the speed of the processing.

If the read first objective function value g is greater than the constraint UB_g, the first calculating section 142 may judge that the solution f stored in the storage section 120 cannot be adopted as the solution of the optimization problem P'(i, j, UB_g) being solved. In this case, the first calculating section 142 may notify the second calculating section 144 that a solution should be calculated. The second calculating section 144 may calculate the solution of this optimization problem P'(i, j, UB_g) in the manner described above. In this case, the updating section 146 may update the value f of the partial problem f*(i, j) and the value g of the partial problem g*(i, j) in association with the information concerning the portion of the sequence having a start position i and an end position j, based on the result calculated by the second calculating section 144.

For example, as shown in FIG. 6, if the optimal solution calculating section 140 makes the division at k=4, the second calculating section 144 calculates the solution of the partial problem f*(1, 4). In this case, the second calculating section 144 stores the values f=2 and g=2.3 in association with the start position of 1 and the end position of 4 in the DP table of the storage section 120, for example. Then, if the optimal solution calculating section 140 makes the division at k=10 and the solution of the partial problem f*(1, 4) is calculated in the next iteration operation, as shown in FIG. 6, the first calculating section 142 checks whether the partial problem f*(1, 4) is stored in the DP table.

Since the partial problem f*(1, 4) is stored in the DP table, the first calculating section 142 may compare the constraint UB_g of the optimization problem P'(1, 4, UB_g) being solved to the stored value g=2.3. If the constraint UB_g is smaller than 2.3, the first calculating section 142 cannot adopt the stored solution. In response to the first calculating section 142 not adopting the solution, the second calculating section 144 may calculate the solution of the optimization problem P'(1, 4, UB_g) and the updating section 146 may update the DP table of the storage section 120.

In the manner described above, the apparatus 100 of the present modification can search for a solution calculated in the past and improve the processing speed, even if the dynamic programming is performed in iterations.

Figure 7:
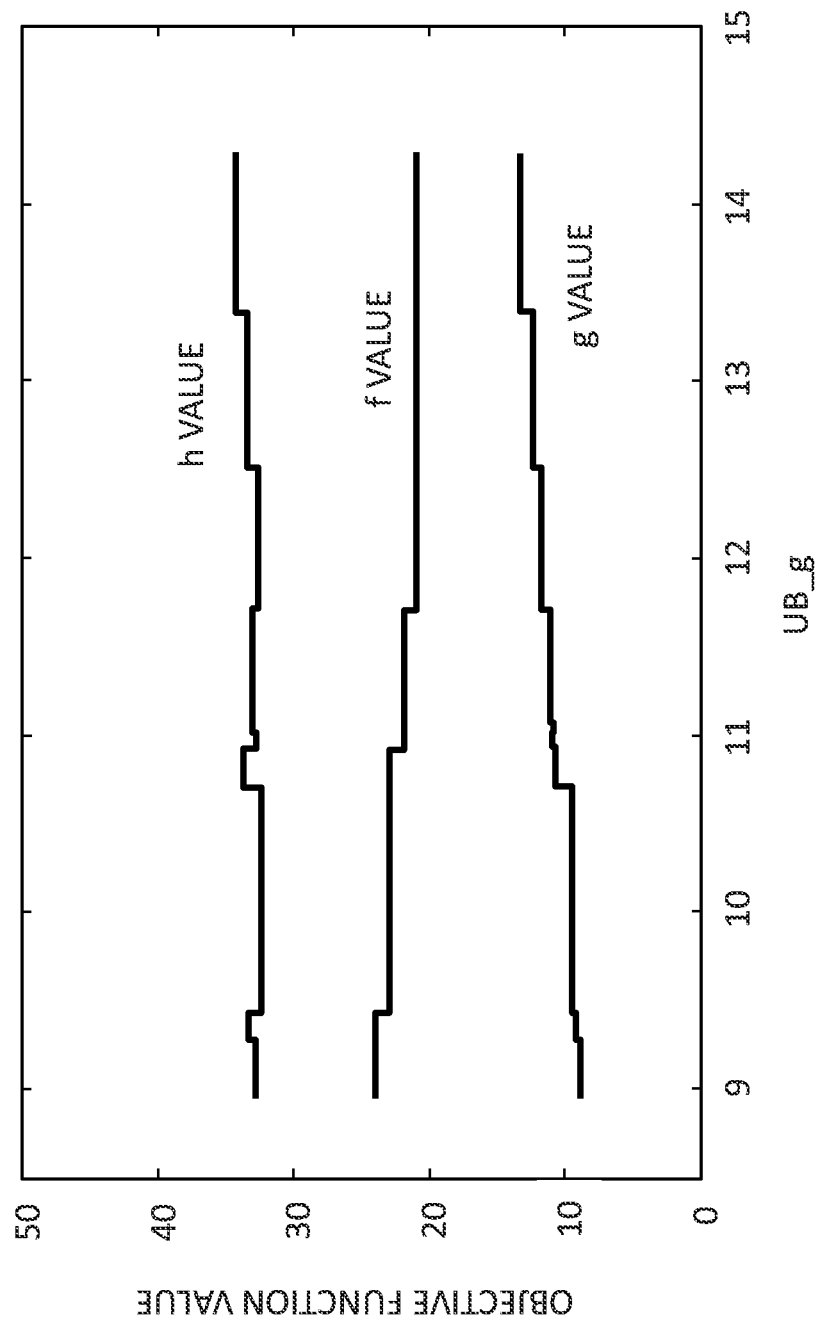
FIG. 7 shows exemplary results obtained by simulating the operation of the apparatus according to the present embodiment.

FIG. 7 shows exemplary results obtained by simulating the operation of the apparatus 100 according to the present embodiment. FIG. 7 shows results obtained by actually calculating the solution of the third objective function, based on artificial data. In FIG. 7, the horizontal axis indicates the value of the constraint UB and the vertical axis indicates the value of the objective function. The value g indicates the solution of the first objective function, the value f indicates the solution of the second objective function, and the value h (=f+g) indicates the solution of the third objective function.

The change in the third objective function value h relative to the change in the constraint UB_g is uneven, as shown in FIG. 7, and therefore it is understood that the optimal solution cannot be calculated using a binary search or the like. The third objective function value h is the sum of the values of the first objective function and the second objective function, and therefore it is possible to calculate the third objective function value h by calculating all combinations of the first objective function and the second objective function for the constraint UB_g. However, it is impossible to judge whether a solution is an optimal solution unless all combinations are calculated, and therefore the solution cannot be obtained efficiently. Furthermore, the calculation amount increases sharply according to the number K of medical devices, and therefore this is not a realistic method for calculating the solution.

In contrast to this, the apparatus 100 monotonically decreases the constraint UB_g and calculates the optimal solution h corresponding to the constraint UB_g, and can therefore efficiently calculate solution candidates without calculating a plurality of optimal solutions for a single value of UB_g. Furthermore, the apparatus 100 calculates the solution by performing iterations of the dynamic programming while updating the constraint UB_g, and can therefore easily calculate the solution without performing a complicated operation.

FIG. 8 shows exemplary performance times in which the apparatus 100, according to the present embodiment, calculates the solution. FIG. 8 shows exemplary performance times relative to the number K of medical devices. The row in FIG. 8 labeled as "baseline (enumeration)" shows the performance time in a case where all combinations of the first objective function and the second objective function are enumerated when calculating the solution. In this case, when the number K of medical devices is increased from 100 to 300, it is seen that the performance time increases sharply by 100 times or more.

The row labeled as "FIG. 2" in FIG. 8 shows the performance time in a case where the solution is calculated by the apparatus 100 according to the embodiment shown in FIG. 2. With the apparatus 100, even when the number K of medical devices is increased from 100 to 300, it is seen that the performance time exhibits a gradual change from several seconds to approximately 1 minute. Furthermore, compared to the "baseline (enumeration)," the necessary performance time of the apparatus 100 is seen to be shorter, only reaching approximately ten percent to several percent of the baseline performance time.

The row labeled as "FIG. 5" in FIG. 8 shows the performance time in a case where the solution is calculated by the modification of the apparatus 100 according to the embodiment shown in FIG. 5. In other words, the row labeled as "FIG. 5" shows results obtained by the apparatus 100 using the DP table to increase the speed of the calculation using the dynamic programming. Compared to the performance time of the apparatus 100, it is seen that the performance time of the apparatus 100 of this modification is shorter by approximately fifty percent. As made clear from the above, the embodiments of the present invention can quickly calculate the solution of the objective function for which the solution could not be calculated using dynamic programming according to the conventional art.

FIG. 9 shows an exemplary pseudo-code of an algorithm with which the apparatus 100 according to the present embodiment calculates the solution of the optimization problem P'(i, j, UB_g) using the DP table. The apparatus 100 may use such an algorithm to calculate the solution of the optimization problem P'(i, j, UB_g) shown in FIG. 6.

The apparatus 100 according to the present embodiment described above is an example in which the apparatus 100 solves, for an arrangement of medical devices in a predetermined order, an optimization problem of "performing packing while minimizing the number of containers used and minimizing the empty space g in the containers." The problem being solved by the apparatus 100 is not limited to such an optimization problem, and the apparatus 100 may be used to calculate the solution of a third objective function based on other first objective functions and second objective functions.

For example, the apparatus 100 may solve a shortest route problem in a car navigation system. The apparatus 100 can solve an optimization problem of "arriving at a destination in a shorter time or across a shorter distance while avoiding heavy traffic in the route" by setting the traffic density in a route as the first objective function value and the travel time or travel distance as the second objective function.

The apparatus 100 may be used as a battery usage plan in a hybrid racing car. The lap time of a hybrid racing car can be improved by controlling the timing at which motor assistance from the battery is used while running on a race course. Furthermore, the battery deteriorates more quickly according to the temperature increase, and therefore it is possible to increase the lifetime and stability of the battery by minimizing the temperature increase caused by the motor assistance operation of the battery while the car is running. Therefore, the apparatus 100 can solve an optimization problem of "driving on a racing course while achieving a faster lap time and minimizing battery temperature" by setting the battery temperature as the first objective function value and the travel time or travel distance as the second objective function.

Figure 10:
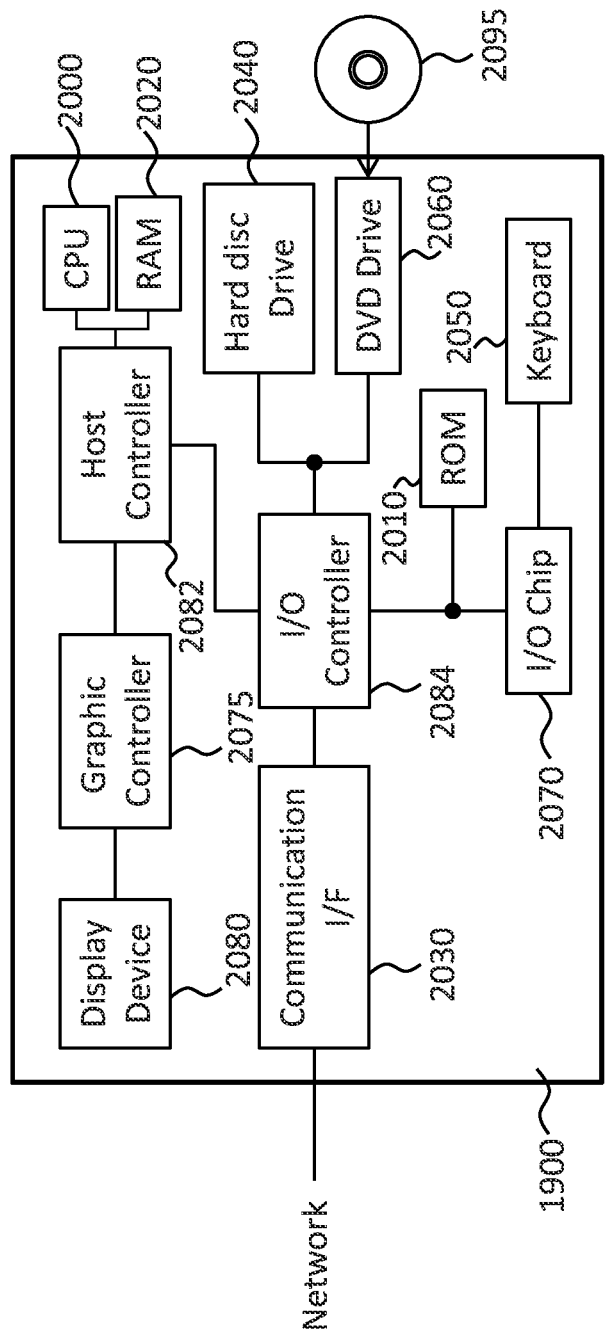
FIG. 10 shows an exemplary hardware configuration of a computer according to the embodiment of the invention.

FIG. 10 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the apparatus 100 of FIG. 1 and FIG. 5, includes an acquiring section, a storage section, a candidate calculating section, an optimal solution calculating section, a first calculating section, a second calculating section, an updating section, a selecting section, a candidate updating section. The program or module acts on the CPU 2000, to cause the computer 1900 to function as a section, component, and element such as acquiring section 110.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the apparatus 100 according to the embodiments of the present invention can calculate the solution of an objective function based on two different objective functions, and can solve more complicated optimization problems.

What is claimed is:

1. An apparatus comprising:
    a hardware processor operatively coupled to one or more computer readable storage mediums collectively including instructions that, when executed by the processor, cause the processor to perform the method of:
    acquiring an initial candidate for optimizing a third objective function based on a first objective function and a second objective function;
    obtaining a first solution optimizing the second objective function under a constraint corresponding to a value of the first objective function, and a second solution optimizing the first objective function using the first solution, the second solution being assigned as the constraint in a next iteration of obtaining a plurality of candidates;
    increasing processing speed and efficiency for the obtaining the plurality of candidates by monotonically decreasing the constraint during calculation of an optimization solution for the third objective function corresponding to the constraint; and
    selecting, as the optimization solution for the third objective function, one of the plurality of candidates associated with an optimized relationship between the first solution and the second solution.

2. The apparatus according to claim 1, wherein the second objective function has an objective function value based on a sum of objective function values for partial problems of the optimization problem.

3. The apparatus according to claim 2, wherein the first objective function has an objective function value based on a largest value or a smallest value of the objective function values for the plurality of partial problems obtained by dividing the optimization problem.

4. The apparatus according to claim 3, wherein the obtaining the other candidate for the solution of the optimization problem includes obtaining an optimal solution that satisfies the constraint for each of the plurality of partial problems obtained by dividing the optimization problem.

5. The apparatus according to claim 4, wherein:
    the instructions further cause the processor to store in a storage section, in association with at least one partial problem among the plurality of partial problems, an objective function value of the at least one partial problem corresponding to the first objective function and an objective function value of the at least one partial problem corresponding to the second objective function; and
    the obtaining the optimal solution that satisfies the constraint for each of the plurality of partial problems includes, for the at least one partial problem, using an objective function value stored in relation to the second objective function, if an objective function value stored in relation to the first objective function satisfies the constraint.

6. The apparatus according to claim 5, wherein the obtaining the optimal solution that satisfies the constraint for each of the plurality of partial problems includes, for the at least one partial problem, obtaining a solution that optimizes an objective function value relating to the second objective function in the at least one partial problem under the constraint, if an objective function value stored in relation to the first objective function does not satisfy the constraint.

7. The apparatus according to claim 5, wherein the obtaining the optimal solution that satisfies the constraint for each of the plurality of partial problems includes updating content of the storage section by using the obtained objective function value relating to the second objective function in the at least one partial problem under the constraint.

8. The apparatus according to claim 1, wherein a value of the third objective function is defined as the sum of the value of the first objective function and a value of the second objective function.

9. The apparatus according to claim 1, wherein the constraint corresponding to the value of the first objective function is an upper bound of the first objective function.

10. The apparatus according to claim 1, wherein:
    the selecting the solution of the optimization problem includes updating the selected candidates for the solution of the optimization problem; and
    the acquiring the candidate for the solution of the optimization problem includes repeating the obtaining the plurality of candidates and the selecting the solution of the optimization problem until there are no more solutions that optimize the second objective function.

11. The apparatus according to claim 1, wherein the selecting the solution of the optimization problem includes selecting the candidate having a value that is lower than respective values of the plurality of candidates for the solution of the optimization problem.

12. A computer-implemented method, comprising:
    acquiring an initial candidate for optimizing a third objective function based on a first objective function and a second objective function;
    obtaining a first solution optimizing the second objective function under a constraint corresponding to a value of the first objective function, and a second solution optimizing the first objective function using the first solution, the second solution being assigned as the constraint in a next iteration of obtaining a plurality of candidates;
    increasing processing speed and efficiency for the obtaining the plurality of candidates by monotonically decreasing the constraint during calculation of an optimization solution for the third objective function corresponding to the constraint; and
    selecting, as the optimization solution for the third objective function, one of the plurality of candidates associated with an optimized relationship between the first solution and the second solution.

13. The method according to claim 12, wherein the second objective function has an objective function value based on a sum of objective function values for partial problems of the optimization problem.

14. The method according to claim 13, wherein the first objective function has an objective function value based on a largest value or a smallest value of the objective function values for the plurality of partial problems obtained by dividing the optimization problem.

15. The method according to claim 14, wherein the obtaining the other candidate for the solution of the optimization problem includes obtaining an optimal solution that satisfies the constraint for each of the plurality of partial problems obtained by dividing the optimization problem.

16. The method according to claim 15, further comprising:
storing in a storage section, in association with at least one partial problem among the plurality of partial problems, an objective function value of the at least one partial problem corresponding to the first objective function and an objective function value of the at least one partial problem corresponding to the second objective function, and
wherein the obtaining the optimal solution that satisfies the constraint for each of the plurality of partial problems includes, for the at least one partial problem, using an objective function value stored in relation to the second objective function, if an objective function value stored in relation to the first objective function satisfies the constraint.

17. The method according to claim 16, wherein the obtaining the optimal solution that satisfies the constraint for each of the plurality of partial problems includes, for the at least one partial problem, obtaining a solution that optimizes an objective function value relating to the second objective function in the at least one partial problem under the constraint, if an objective function value stored in relation to the first objective function does not satisfy the constraint.

18. The method according to claim 16, wherein the obtaining the optimal solution that satisfies the constraint for each of the plurality of partial problems includes updating content of the storage section by using the obtained objective function value relating to the second objective function in the at least one partial problem under the constraint.

19. The method according to claim 12, wherein:
the selecting the solution of the optimization problem includes updating the selected candidates for the solution of the optimization problem; and
the acquiring the candidate for the solution of the optimization problem includes repeating the obtaining the other candidate for the solution of the optimization problem and the selecting the solution of the optimization problem until there are no more solutions that optimize the second objective function.

20. A computer program product comprising a non-transitory computer readable storage medium having program instructions embodied therewith, the program instructions executable by a computer to cause the computer to:
acquire an initial candidate for optimizing a third objective function based on a first objective function and a second objective function;
obtain a first solution optimizing the second objective function under a constraint corresponding to a value of the first objective function, and a second solution optimizing the first objective function using the first solution, the second solution being assigned as the constraint in a next iteration of obtaining a plurality of candidates;
increase processing speed and efficiency for the obtaining the plurality of candidates by monotonically decreasing the constraint during calculation of an optimization solution for the third objective function corresponding to the constraint; and
select, as the optimization solution for the third objective function, one of the plurality of candidates associated with an optimized relationship between the first solution and the second solution.

\* \* \* \* \*